(12) United States Patent
Jang et al.

(10) Patent No.: US 11,424,508 B2
(45) Date of Patent: Aug. 23, 2022

(54) RECHARGEABLE BATTERY

(71) Applicant: Samsung SDI Co., Ltd., Yongin-si (KR)

(72) Inventors: Myungjae Jang, Yongin-si (KR); Sangwon Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 692 days.

(21) Appl. No.: 16/319,588

(22) PCT Filed: Jun. 29, 2017

(86) PCT No.: PCT/KR2017/006911
§ 371 (c)(1),
(2) Date: Jan. 22, 2019

(87) PCT Pub. No.: WO2018/034425
PCT Pub. Date: Feb. 22, 2018

(65) Prior Publication Data
US 2021/0305655 A1 Sep. 30, 2021

(30) Foreign Application Priority Data
Aug. 18, 2016 (KR) .................. 10-2016-0104880

(51) Int. Cl.
*H01M 10/02* (2006.01)
*H01M 50/342* (2021.01)
*H01M 10/0587* (2010.01)

(52) U.S. Cl.
CPC ..... *H01M 50/342* (2021.01); *H01M 10/0587* (2013.01)

(58) Field of Classification Search
CPC .................. H01M 50/342; H01M 10/0587
See application file for complete search history.

(56) References Cited

U.S. PATENT DOCUMENTS

| 3,556,863 A | 1/1971 | Nathe |
| 2003/0129479 A1 | 7/2003 | Munenaga et al. |

(Continued)

FOREIGN PATENT DOCUMENTS

| CN | 100364150 C | 1/2008 |
| CN | 102064333 A | 5/2011 |

(Continued)

OTHER PUBLICATIONS

Chinese Office Action, with English translation, dated Jan. 5, 2021, issued in corresponding Chinese Patent Application No. 201780047754.4 (20 pages).

(Continued)

*Primary Examiner* — Cynthia K Walls
(74) *Attorney, Agent, or Firm* — Lewis Roca Rothgerber Christie LLP

(57) ABSTRACT

A rechargeable battery according to an exemplary embodiment of the present invention includes: an electrode assembly; a casing which accommodates the electrode assembly and has an opening; a cap assembly which is coupled through the opening and seals the casing; a spacer which is positioned between the electrode assembly and the casing and has multiple holes; and a vent member which is formed on a bottom surface of the casing which is positioned opposite to the opening.

11 Claims, 9 Drawing Sheets

(56) References Cited

U.S. PATENT DOCUMENTS

| | | | |
|---|---|---|---|
| 2004/0126650 A1* | 7/2004 | Kim | H01M 50/531 429/61 |
| 2005/0084753 A1* | 4/2005 | Kim | H01M 50/116 429/186 |
| 2006/0024578 A1 | 2/2006 | Lee | |
| 2011/0097613 A1 | 4/2011 | Kim et al. | |
| 2011/0117402 A1 | 5/2011 | Kim et al. | |
| 2014/0045000 A1* | 2/2014 | Kim | H01M 10/0525 429/56 |
| 2014/0087223 A1 | 3/2014 | Hamakawa et al. | |
| 2015/0104684 A1* | 4/2015 | Kim | H01M 50/20 429/94 |
| 2015/0295217 A1 | 10/2015 | Kwak et al. | |
| 2017/0317326 A1* | 11/2017 | Fujikawa | H01M 50/578 |
| 2017/0331090 A1 | 11/2017 | Li et al. | |

FOREIGN PATENT DOCUMENTS

| | | |
|---|---|---|
| CN | 103579535 A | 2/2014 |
| CN | 103682452 A | 3/2014 |
| CN | 104979506 A | 10/2015 |
| CN | 107394063 A | 11/2017 |
| EP | 3 246 967 A1 | 11/2017 |
| JP | 2000-182591 A | 6/2000 |
| JP | 2002-231297 A | 8/2002 |
| JP | 2003-346876 A | 12/2003 |
| JP | 2014-11115 A | 1/2014 |
| JP | 2014-78447 A | 5/2014 |
| KR | 10-2011-0053163 A | 5/2011 |
| KR | 10-1084055 B1 | 11/2011 |
| KR | 10-2014-0020482 A | 2/2014 |
| KR | 10-2015-0118326 A | 10/2015 |
| KR | 10-2016-0015898 A | 2/2016 |

OTHER PUBLICATIONS

EPO Supplemental Search Report dated Nov. 29, 2019, for corresponding European Patent Application No. 17841609.5 (17 pages).
Extended European Search Report for corresponding European Patent Application No. 17841609.5, dated Mar. 11, 2020, 17 pages.
Chinese Office action issued in corresponding application No. CN 201780047754.4, dated Dec. 3, 2021, 13 pages.
Chinese Office action issued in corresponding application No. CN 201780047754.4 dated Aug. 24, 2021, 13 pages (including translation).

* cited by examiner

【Figure 1】
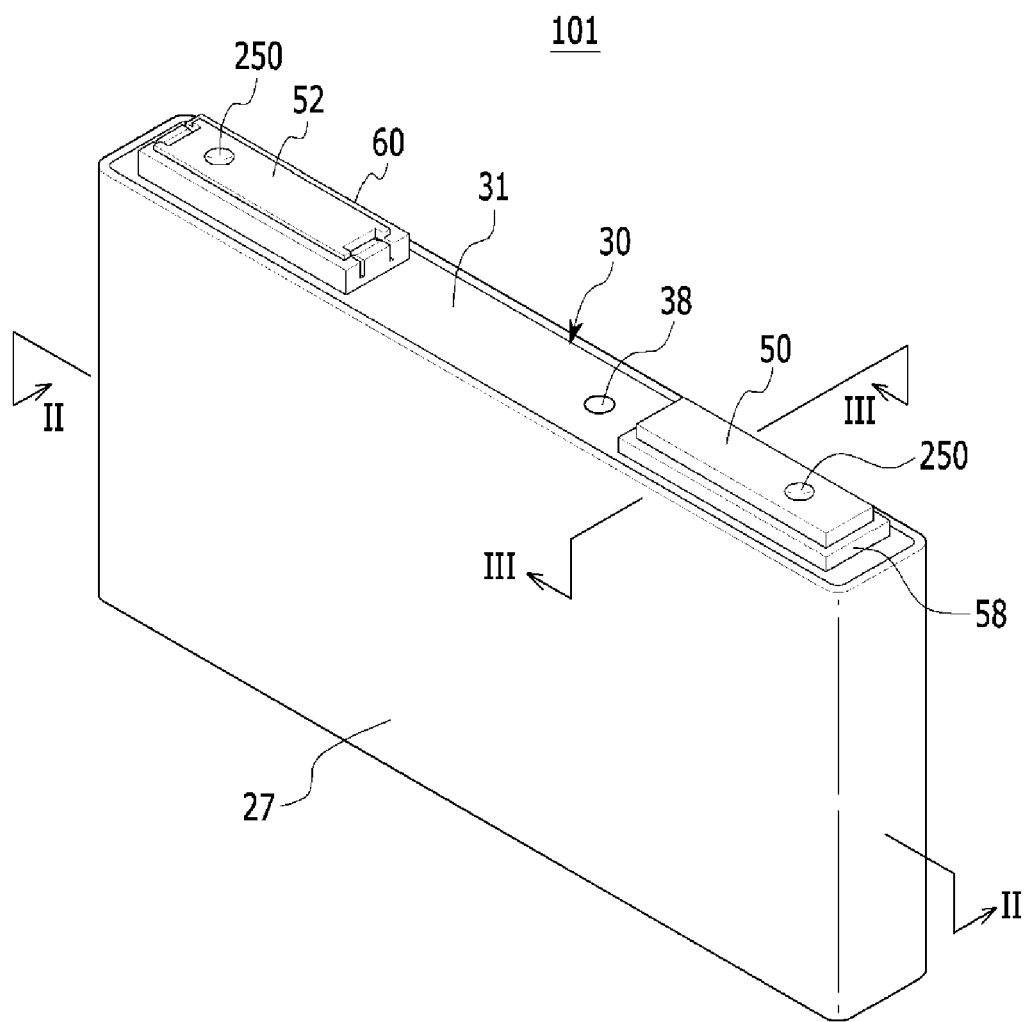

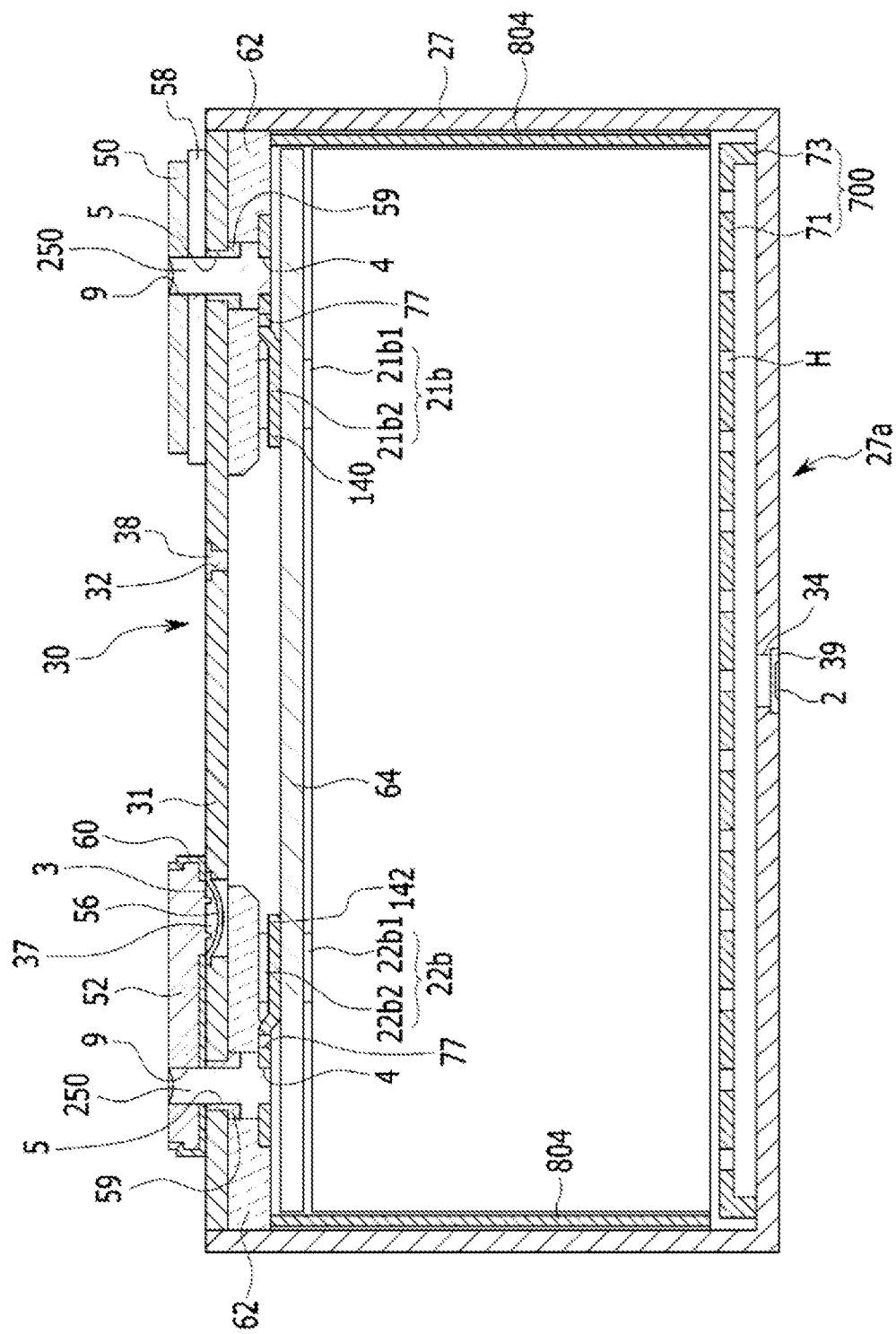
[Figure 2]

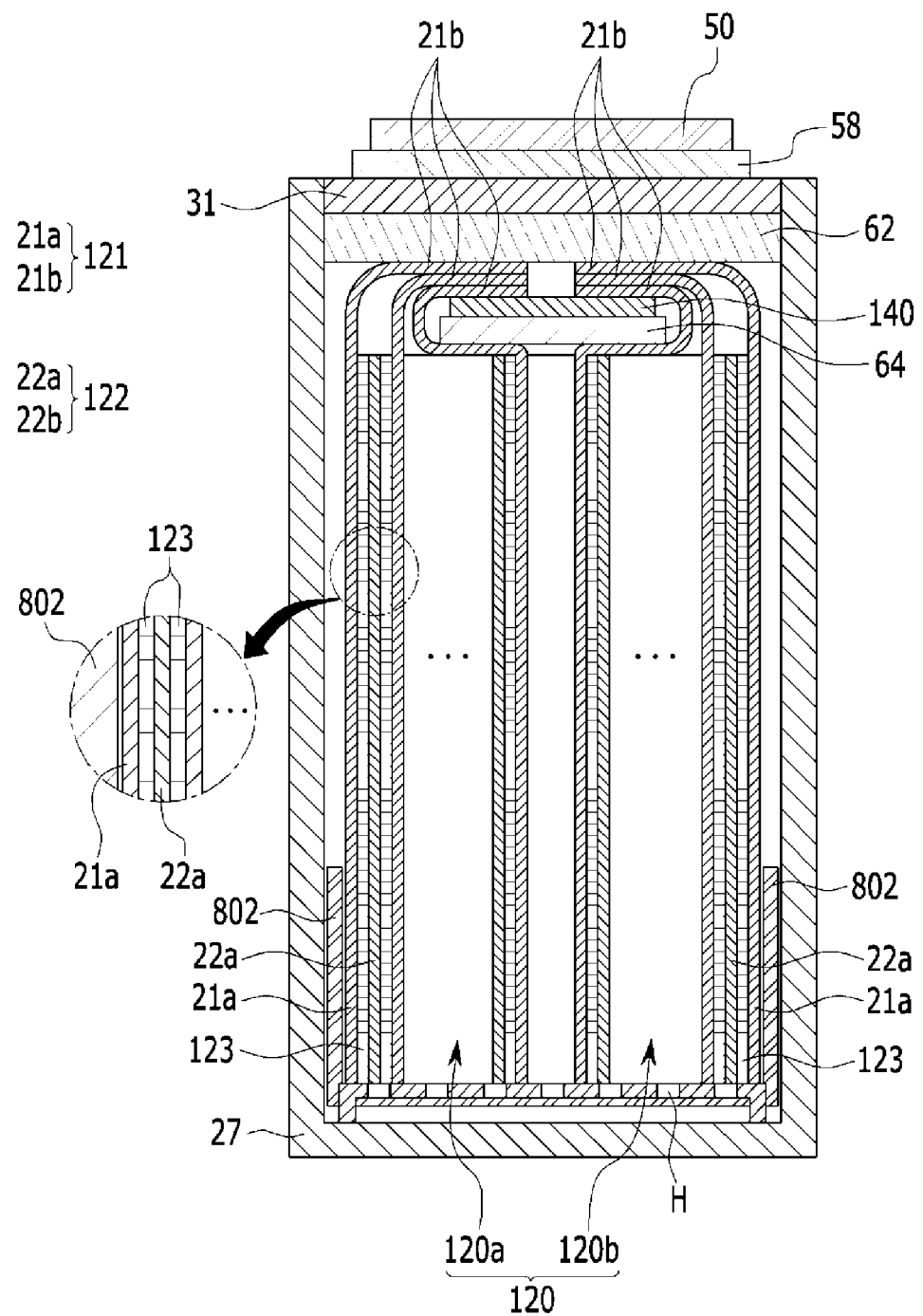
[Figure 3]

[Figure 4]
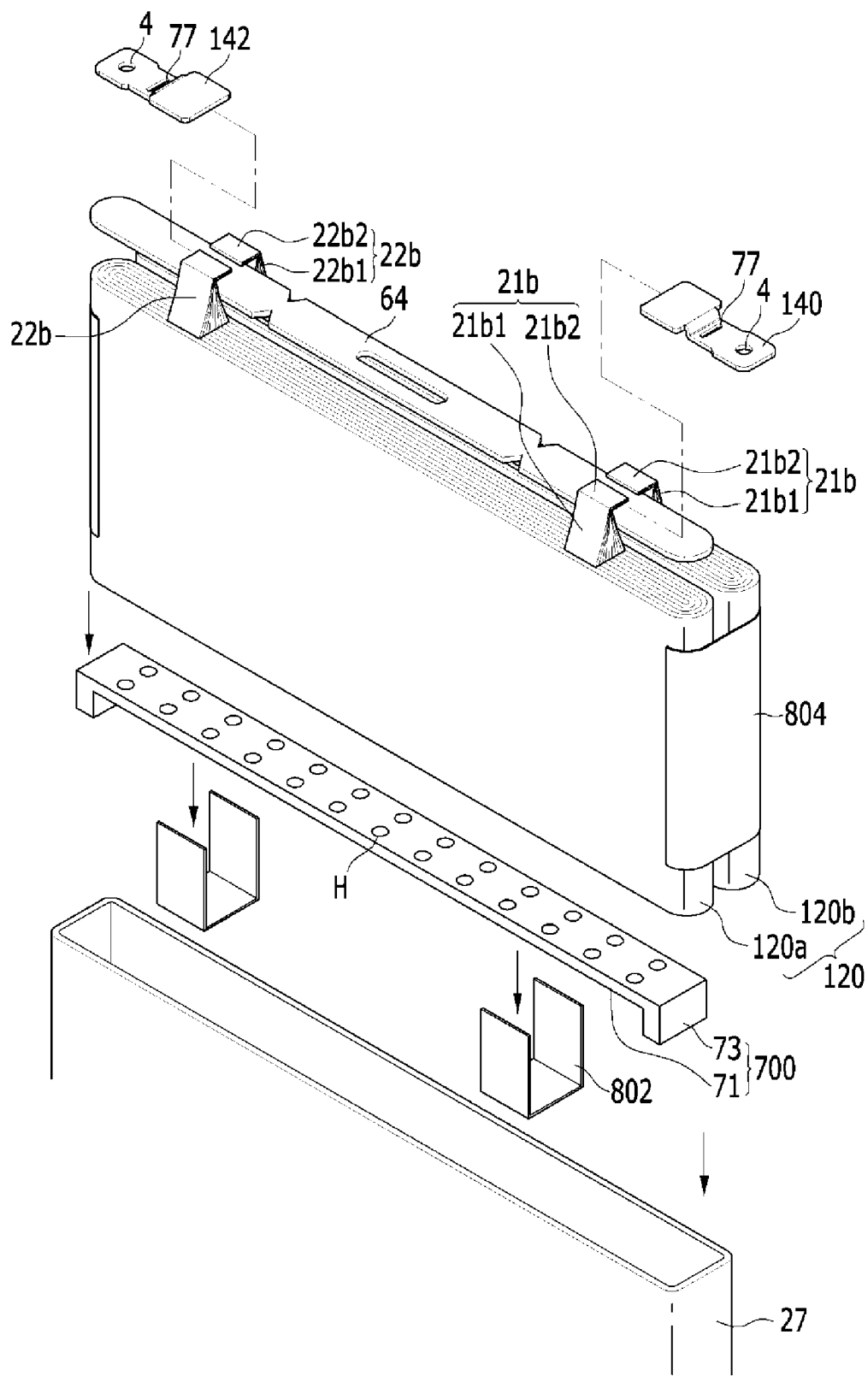

【Figure 5】
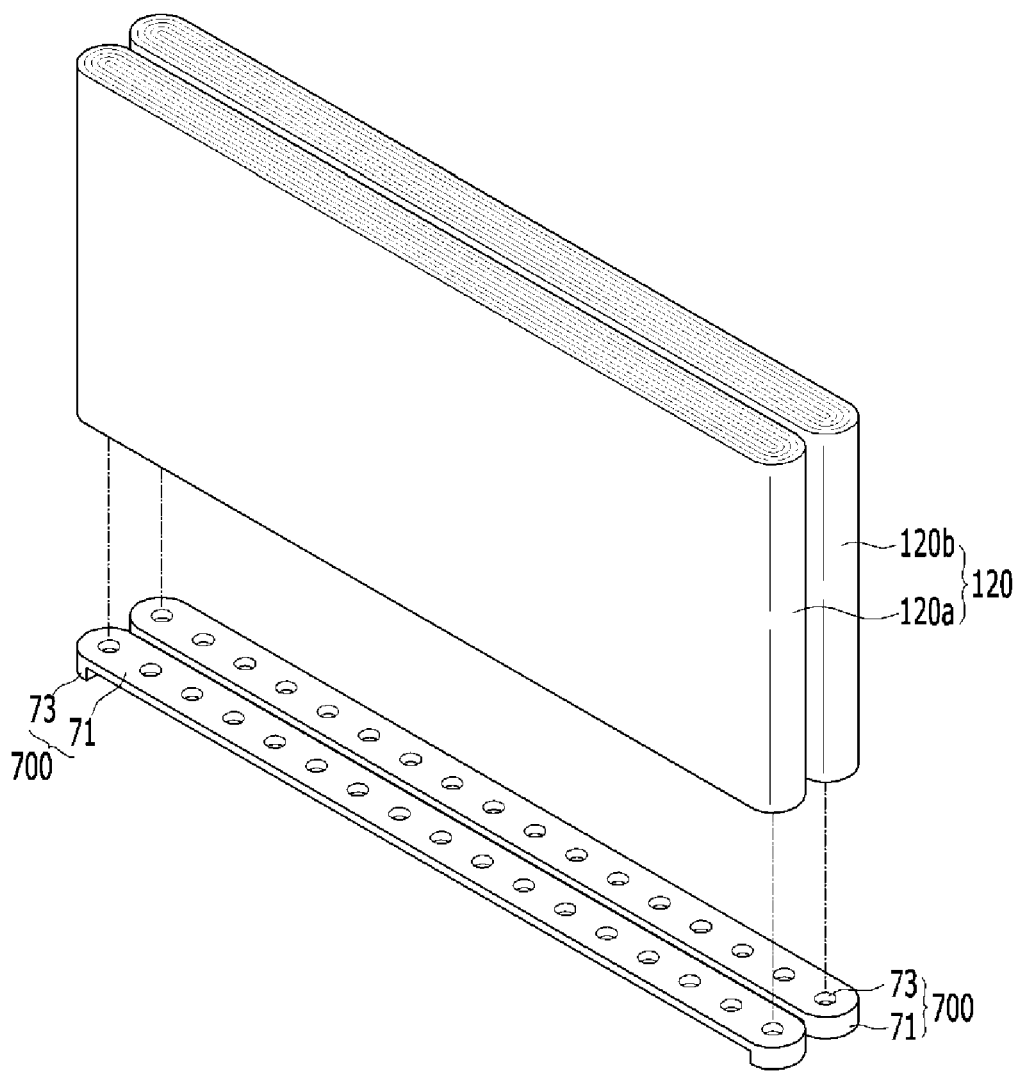

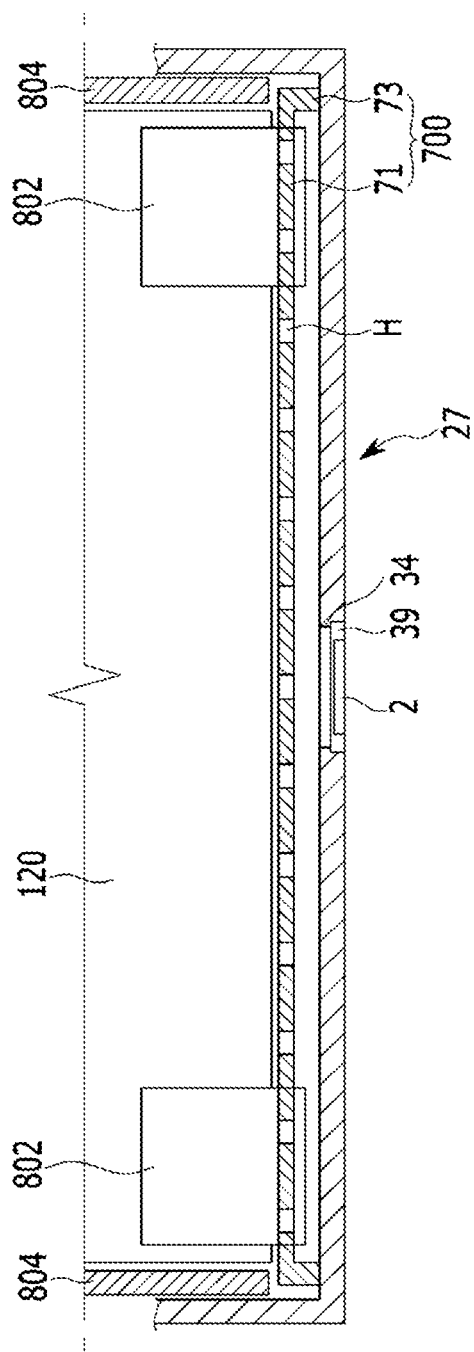
[Figure 6]

【Figure 7】
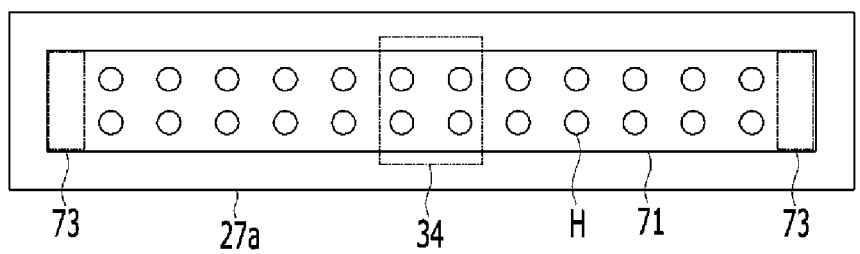

[Figure 8]
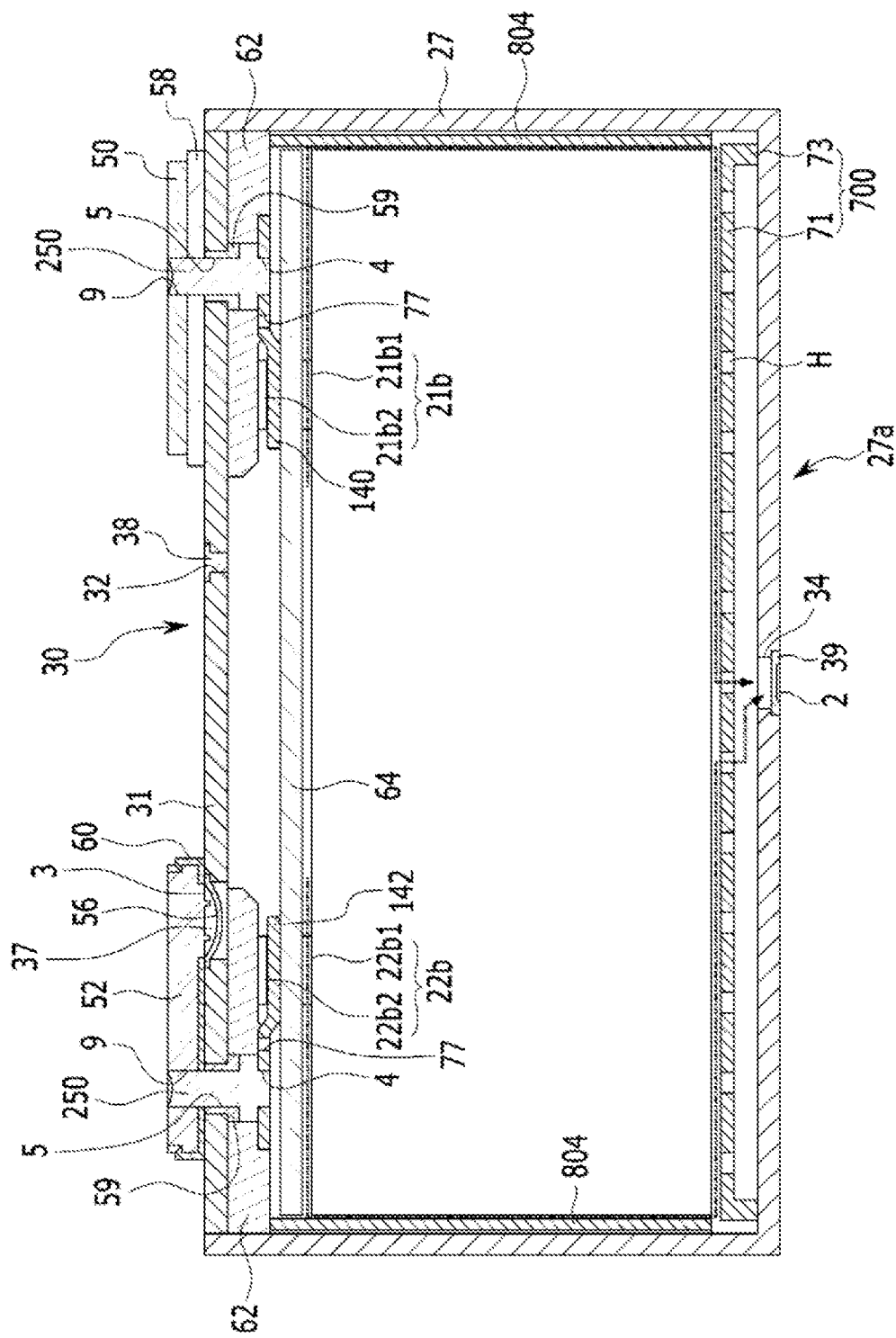

[Figure 9]
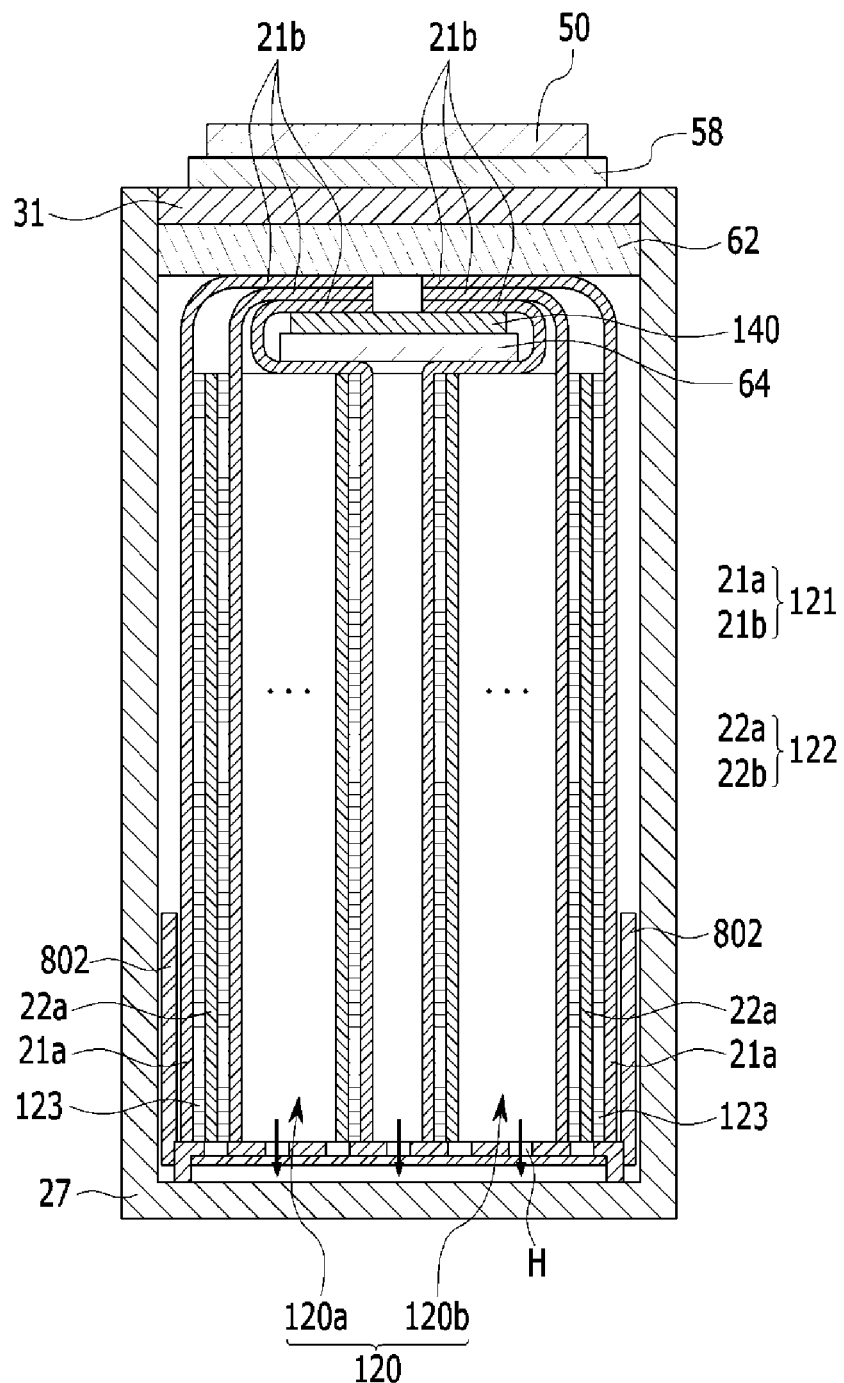

RECHARGEABLE BATTERY

CROSS-REFERENCE TO RELATED APPLICATION(S)

This application is a National Phase Patent Application of International Patent Application Number PCT/KR2017/006911, filed on Jun. 29, 2017, which claims priority of Korean Patent Application No. 10-2016-0104880, filed Aug. 18, 2016. The entire contents of both of which are incorporated herein by reference.

TECHNICAL FIELD

The present disclosure relates to a rechargeable battery.

BACKGROUND ART

Unlike a primary battery that cannot be charged, a rechargeable battery may be charged and discharged. A low-capacity rechargeable battery is used for a small-sized portable electronic device such as a mobile phone, a notebook computer, and a camcorder, and a high-capacity rechargeable battery is widely used as a power source for operating a motor in a hybrid vehicle or the like.

The rechargeable battery has a structure in which a positive electrode, a separator, a negative electrode, and an electrolyte are accommodated in a casing. The casings may have various shapes such as an angled shape, a pouch shape, and a circular shape. An electrode assembly is accommodated in the casing which is made of a metal material such as aluminum among the casings, and then an interior of the electrode assembly is sealed by blocking the interior of the electrode assembly with a cap plate or the like.

Meanwhile, the rechargeable battery has a safety device that prevents explosion of the rechargeable battery by being broken when internal pressure in the casing is increased due to an abnormal reaction or external impact and reaches a predetermined pressure condition or higher.

The safety device may be installed below the casing, but in the case in which the safety device is installed below the casing, gas may not be easily discharged due to the electrode assembly.

DISCLOSURE

Technical Problem

The present invention has been made in an effort to provide a rechargeable battery capable of reducing a risk of explosion by easily discharging gas even though a safety device is positioned below a casing.

Technical Solution

An exemplary embodiment of the present invention provides a rechargeable battery including: an electrode assembly; a casing which accommodates the electrode assembly and has an opening; a cap assembly which is coupled through the opening and seals the casing; a spacer which is positioned between the electrode assembly and the casing and has multiple holes; and a vent member which is formed on a bottom surface of the casing which is positioned opposite to the opening.

The spacer may include a plate-shaped member which has the holes, and multiple protrusions which protrude toward the casing from the plate-shaped member.

The protrusions may be disposed to be symmetrical with respect to an imaginary centerline of the plate-shaped member.

At least one of the holes may correspond to the vent member.

The rechargeable battery may further include a first fixing member which surrounds the spacer and the electrode assembly.

The first fixing members may be positioned at both sides based on the vent member.

The multiple electrode assemblies may be formed.

The rechargeable battery may further include a second fixing member which surrounds a lateral surface of the electrode assembly positioned continuously.

The second fixing member may be elongated in a direction in which the electrode assembly is inserted into the casing.

The electrode assembly may be wound.

The first fixing member may be a polypropylene (PP) tape, and the second fixing member may be a polyimide (PI) tape.

The spacer may be made of an insulating material.

Advantageous Effects

According to the exemplary embodiment of the present invention, the spacer is installed between the electrode assembly and the casing, such that a gas flow path may be easily formed even though the vent member is positioned on the bottom plate of the casing.

Therefore, the vent member is easily broken when internal pressure in the casing goes beyond a predetermined level, and gas in the casing is discharged, such that additional explosion may be prevented.

DESCRIPTION OF THE DRAWINGS

FIG. 1 is a perspective view illustrating a rechargeable battery according to an exemplary embodiment of the present invention.

FIG. 2 is a cross-sectional view taken along line II-II in FIG. 1.

FIG. 3 is a cross-sectional view taken along line III-III in FIG. 1.

FIG. 4 is an exploded perspective view of a partial configuration of the rechargeable battery in FIG. 1.

FIG. 5 is an exploded perspective view illustrating an electrode assembly and a spacer of a rechargeable battery according to another exemplary embodiment of the present invention.

FIG. 6 is a cross-sectional view illustrating a lower side of the rechargeable battery according to the exemplary embodiment of the present invention.

FIG. 7 is a schematic view for explaining a bottom plate and the spacer according to the exemplary embodiment of the present invention.

FIGS. 8 and 9 are views for explaining a discharge of gas in the rechargeable battery according to the exemplary embodiment of the present invention.

MODE FOR INVENTION

Hereinafter, exemplary embodiments of the present invention will be described in detail with reference to the accompanying drawings so that those skilled in the technical field to which the present invention pertains may easily carry out the exemplary embodiments. The present invention may be implemented in various different ways, and is not limited to the exemplary embodiments described herein.

A part irrelevant to the description will be omitted to clearly describe the present invention, and the same or similar constituent elements will be designated by the same reference numerals throughout the specification.

In addition, each configuration illustrated in the drawings is arbitrarily shown for understanding and ease of description, but the present invention is not limited thereto.

In the drawings, the thickness of layers, films, panels, regions, etc., are exaggerated for clarity. In the drawings, the thicknesses of some layers and regions are exaggerated for convenience of explanation. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. In addition, throughout the specification, "one object is positioned on the other object" means that one object is positioned over or under the other object, but does not necessarily mean that one object is positioned over the other object based on the gravitational direction.

Hereinafter, a rechargeable battery according to an exemplary embodiment of the present invention will be specifically described with reference to the accompanying drawings.

FIG. 1 is a perspective view illustrating a rechargeable battery according to an exemplary embodiment of the present invention, FIG. 2 is a cross-sectional view taken along line II-II in FIG. 1, and FIG. 3 is a cross-sectional view taken along line III-III in FIG. 1.

As illustrated in FIGS. 1 to 3, a rechargeable battery 101 according to an exemplary embodiment of the present invention includes an electrode assembly 120 which is wound with a separator 123 interposed between a first electrode 121 and a second electrode 122, current collecting members 140 and 142 which are electrically connected to the electrode assembly 120, a casing 27 which accommodates the current collecting members 140 and 142 and the electrode assembly 120, and a cap assembly 30 which is coupled to an opening of the casing 27.

An example in which the rechargeable battery 101 is an angled type lithium ion rechargeable battery will be described. However, the present invention is not limited thereto, and the present invention may be applied to batteries having various shapes such as a lithium polymer battery or a cylindrical battery.

The electrode assembly 120 may include multiple assemblies 120a and 120b, and each of the assemblies 120a and 120b may be wound about a winding axis and pressed flat, with the separator 123 interposed between the first electrode 121 and the second electrode 122. The first electrode 121 and the second electrode 122 include electrode active portions 21a and 22a which are regions made by applying an active material onto thin plates formed by metal foils, and electrode non-coated portions 21b and 22b which are regions onto which no active material is applied.

The first electrode active portion 21a may be formed by applying an active material such as transition metal oxide onto a metal foil made of aluminum, and the second electrode active portion 22a may be formed by applying an active material such as graphite or carbon onto a metal foil made of copper or nickel.

The first electrode non-coated portion 21b and the second electrode non-coated portion 22b protrude in parallel toward the cap assembly from one side of the first electrode active portion and one side of the second electrode active portion. The first electrode non-coated portion 21b and the second electrode non-coated portion 22b are formed by being cut so as to protrude from the metal foils, such that the first electrode non-coated portion 21b and the second electrode non-coated portion 22b may be formed integrally with the metal foil of the first electrode active portion 21a and the second electrode active portion 22a.

The first electrode non-coated portion 21b and the second electrode non-coated portion 22b have different polarities and are disposed to be spaced apart from each other at a predetermined distance.

In addition, since the first electrode 121 and the second electrode 122 are wound or superimposed, the first electrode non-coated portion 21b and the second electrode non-coated portion 22b may be formed by superimposing multiple thin films. In the case in which the first electrode non-coated portion 21b and the second electrode non-coated portion 22b may be formed by superimposing multiple thin films as described above, the thin films may be connected to be in contact with one another by ultrasonic welding to make it easy to move an electric current.

The separator 123 is positioned between the first electrode active portion 21a and the second electrode active portion 22a and serves to prevent a short circuit and enable a movement of lithium ions. For example, the separator 123 may be formed by a film made of polyethylene, polypropylene, or a combination thereof.

The electrode assembly 120 may include the multiple electrode assemblies, and the multiple electrode assemblies will be described with reference to FIG. 4 and the aforementioned FIG. 3.

As an example, the electrode assembly 120 including the first electrode assembly 120a and the second electrode assembly 120b is illustrated in FIG. 4.

FIG. 4 is an exploded perspective view illustrating a partial configuration of the rechargeable battery in FIG. 1, and FIG. 5 is an exploded perspective view illustrating an electrode assembly and a spacer of a rechargeable battery according to another exemplary embodiment of the present invention.

As illustrated in FIGS. 3 and 4, the first electrode assembly 120a and the second electrode assembly 120b included in the electrode assembly 120 may be electrically connected.

In the first electrode assembly 120a and the second electrode assembly 120b, the electrode non-coated portions having the same polarity are electrically connected by the current collecting members 140 and 142. That is, the first electrode non-coated portions 21b of the first electrode assembly 120a and the second electrode assembly 120b are electrically connected by the first current collecting member 140, and the second electrode non-coated portions 22b of the first electrode assembly 120a and the second electrode assembly 120b are electrically connected by the second current collecting member 142.

In this case, the first electrode non-coated portions 21b of the first electrode assembly 120a and the second electrode assembly 120b are bent in a direction in which the first electrode non-coated portions 21b face each other, and the second electrode non-coated portions 22b of the first electrode assembly 120a and the second electrode assembly 120b are bent in a direction in which the second electrode non-coated portions 22b face each other. Therefore, the electrode non-coated portions 21b and 22b may include a first non-coated portion 21b1 which is connected to the metal foil of the electrode active portion and protrudes in a direction toward the cap assembly, and a second non-coated portion 21b2 which extends from the first non-coated portion and has one surface in contact with the current collecting members 140 and 142.

One surface (surface relatively close to a cap plate) of the first current collecting member 140 and one surface (surface relatively close to a current collector) of the second non-coated portion 21b2 may be in contact with each other to be electrically connected, and one surface (surface relatively close to the cap plate) of the second current collecting member 142 and one surface (surface relatively close to the current collector) of the second non-coated portion 22b2 may be in contact with each other to be electrically connected.

The first current collecting member 140 and the second current collecting member 142 may have the same shape.

Each of the first current collecting member 140 and the second current collecting member 142 may have a first terminal hole 4 and a fuse hole 77. The first terminal hole 4 is a hole into which a connection terminal 250 is inserted, and the first terminal hole 4 may have the same shape as a cross section of the connection terminal 250. The first terminal hole 4 may have, for example, a circular shape. The connection terminals 250 are connected to a first terminal 50 and a second terminal 52 outside the cap assembly 30 (see FIG. 2) and move an electric current.

The fuse hole 77 is formed by removing a part of each of the first current collecting member 140 and the second current collecting member 142, and a fuse is formed as a width at the periphery of the fuse hole 77 is narrower than widths of the other portions thereof. When an overcurrent flows due to an abnormal reaction in the rechargeable battery, the fuse is easily cut to block the flow of the electric current.

The electrode assembly 120 may be inserted into the casing 27 in a direction parallel to the winding axis, and the electrode assembly 120, substantially together with an electrolyte, is accommodated in the casing 27. The electrolyte may be made of lithium salt such as $LiPF_6$ or $LiBF_4$ in an organic solvent such as EC, PC, DEC, EMC, and DMC. The electrolyte may be in the form of a liquid, a solid, or a gel.

A spacer 700 is installed between the electrode assembly 120 and the bottom surface in the casing 27. The spacer 700 may be positioned to correspond to all of the multiple electrode assemblies 120a and 120b. In addition, as illustrated in FIG. 5, the spacer 700 may correspond to each of the electrode assemblies 120a and 120b.

The spacer 700 includes a plate-shaped member 71 which has multiple holes H, and multiple protrusions 73 which protrude from the plate-shaped member 71 toward the bottom surface in the casing 27.

As illustrated in FIG. 4, the plate-shaped member 71 may have, but not limited to, an approximately quadrangular shape, and as illustrated in FIG. 5, the plate-shaped member 71 may have the same shape as bottom surfaces of the electrode assemblies 120a and 120b. The multiple holes H may be formed at a constant interval, but the present invention is not limited thereto, and the multiple holes H may be disposed in various manners as long as inside gas may be easily moved to a vent member.

The protrusions 73 are positioned between the holes of the plate-shaped member 71 to support the plate-shaped member 71, such that the bottom surface in the casing 27 and the plate-shaped member 71 may be spaced apart from each other at a predetermined interval. The protrusions 73 may be disposed to be symmetrical with respect to an imaginary centerline of the plate-shaped member so that the plate-shaped member 71 is not tilted.

The spacer 700 may be made of an insulating material, for example, polypropylene (PP).

The electrode assembly 120 may be surrounded by one or more first fixing members 802 and one or more second fixing members 804. The first fixing member 802 serves to fix the spacer 700 and the electrode assembly 120 and may be formed from one surface to the other surface via the bottom surface of the electrode assembly 120, such that the first fixing member 802 may surround the spacer 700 positioned on the bottom surface.

The first fixing member 802 may overlap and surround the protrusion 73, but the first fixing member 802 may be formed to surround a portion between the protrusions 73 in order to increase coupling force with respect to the spacer 700. Therefore, the protrusions 73 may be disposed at an interval larger than a width of the first fixing member 802.

The second fixing member 804 serves to fix the electrode assemblies and may surround lateral surfaces of the continuously disposed electrode assemblies 120a and 120b, and the second fixing member 804 may be elongated in the direction in which the electrode assembly 120 is inserted into the casing 27.

Each of the first fixing member 802 and the second fixing member 804 may be a polypropylene (PP) tape or a polyimide (PI) tape. In this case, a part which generates a relatively larger amount of heat, for example, the second fixing member 804, which surrounds the electrode assembly, may be a polyimide tape that has better heat resistance than the material of the first fixing member 802.

Referring back to FIGS. 1 to 3, the casing 27 has an approximately rectangular parallelepiped shape and has an opening opened at one side thereof. The casing 27 may be made of metal such as aluminum or stainless steel.

A bottom plate 27a, which is positioned opposite to the opening of the casing 27, includes a vent hole 34 in which a vent member 39 is installed. The vent member 39 may have a notch 2 so that the vent member 39 may be opened at a predetermined pressure.

The vent member 39 is broken by internal pressure in the rechargeable battery to serve to prevent the rechargeable battery from protruding, and therefore, the notch 2 of the vent member 39 may have a thickness smaller than a thickness of other portions, that is, a portion which is in contact with the bottom plate 27a of the casing 27 so that the vent member 39 may be easily broken at a predetermined pressure or higher.

FIG. 6 is a cross-sectional view illustrating a lower side of the rechargeable battery according to the exemplary embodiment of the present invention, and FIG. 7 is a schematic view for explaining the bottom plate and the spacer according to the exemplary embodiment of the present invention.

Referring to FIGS. 6 and 7, the vent hole 34 may be positioned at an approximate center of the bottom plate 27a, and at least one of the holes H of the spacer 700 may be formed to correspond to the vent hole 34. The vent hole 34 may be positioned at an approximate center of the bottom plate 27a of the casing 27 and may be positioned to be spaced apart from the first fixing member 802 so that the vent hole 34 does not overlap the first fixing member 802.

Referring back to FIGS. 1 to 3, the cap assembly 30 includes a cap plate 31 which covers the opening of the casing 27, the first terminal 50 which protrudes outward from the cap plate 31 and is electrically connected with the first electrode 121, and the second terminal 52 which protrudes outward from the cap plate 31 and is electrically connected with the second electrode 122.

The cap plate 31 has an elongated plate shape continuously formed in one direction, and the cap plate 31 is coupled to the opening of the casing 27. The cap plate 31 may be made of the same material as the casing 27 and coupled to the casing 27 by laser welding. Therefore, the cap plate 31 may have the same polarity as the casing 27.

The cap plate 31 has an electrolyte injection port 32 for injecting an electrolyte, and second terminal holes 5 into which the connection terminals 250 are inserted. Further, the vent member 39, which has the notch 2 so that the vent member 39 is opened at a predetermined pressure, is installed in the vent hole 34. A sealing closure 38 is installed in the electrolyte injection port 32, and the connection terminals 250 are inserted into the second terminal holes 5.

The first terminal 50 and the second terminal 52 are coupled to the connection terminals, respectively, and positioned on the cap plate 31.

The first terminal 50 is electrically connected to the first electrode 121 through the first current collecting member 140, and the second terminal 52 is electrically connected to the second electrode 122 through the second current collecting member 142. However, the present invention is not limited thereto, and the first terminal 50 may be electrically connected to the second electrode, and the second terminal 52 may be electrically connected to the first electrode.

The first terminal 50 has a rectangular plate shape. The first terminal 50 is electrically connected to the first electrode 121 through the connection terminal 250 which is inserted into the first terminal hole 4 and the second terminal hole 5 in addition to the third terminal hole 9 formed in the first terminal 50, and joined to the first current collecting member 140.

In this case, the connection terminal 250 has a column shape, and an upper end of the connection terminal 250 is fixed to the first terminal 50 by welding in a state in which the connection terminal 250 is fitted into the third terminal hole 9. In addition, a lower end of the connection terminal 250 is fixed to the first current collecting member 140 by welding in a state in which the connection terminal 250 is fitted into the first terminal hole 4. Therefore, the first electrode 121 may be electrically connected to the first terminal 50 through the first current collecting member 140 and the connection terminal 250.

In the second terminal hole 5, a sealing gasket 59 seals a portion between the connection terminal 250 and the cap plate 31.

Similar to the first terminal 50, the second terminal 52 is also electrically connected to the second electrode 122 through the second current collecting member 142 and the connection terminal 250 inserted into the first to third terminal holes 4, 5, and 9.

A connecting member 58 is formed between the first terminal 50 and the cap plate 31, and a first insulating member 60 is formed between the second terminal 52 and the cap plate 31.

Therefore, since the casing 27 and the cap plate 31 are electrically connected to the first terminal 50 through the connecting member 58, the casing 27 and the cap plate 31 are charged to have the polarity identical to the polarity of the first electrode 121. Further, the second terminal 52 is insulated from the cap plate 31 by the first insulating member 60.

The second terminal 52 is elongated in one direction so as to cover a short-circuiting hole 37 formed in the cap plate 31.

Therefore, the first insulating member 60 may be elongated along the second terminal 52 and may surround a lateral surface of the second terminal 52. The first insulating member 60 includes a cut-out portion that corresponds to the short-circuiting hole 37, and a short-circuiting protrusion 3, which protrudes toward the short-circuiting hole 37 through the cut-out portion, is formed on a lower portion of the second terminal 52.

Meanwhile, a short-circuiting member 56, which is connected to a sidewall of the short-circuiting hole 37 and short-circuits the first electrode 121 and the second electrode 122, is installed in the short-circuiting hole 37 of the cap plate 31.

The short-circuiting member 56 includes a curved portion which is curved in a convex arc shape toward the electrode assembly 120, and a rim portion which is formed outside the curved portion and fixed to the sidewall of the short-circuiting hole 37.

When gas is generated due to an abnormal reaction in the rechargeable battery, internal pressure of the rechargeable battery is increased. When the internal pressure of the rechargeable battery becomes higher than a predetermined pressure, the curved portion becomes convex in a direction toward the second terminal 52 and comes into contact with the short-circuiting protrusion 3 of the second terminal 52, thereby causing a short circuit. When the short circuit occurs as described above, the battery reaction occurs no longer, such that explosion or the like caused by an increase in internal pressure may be prevented.

Second insulating members 62 are formed between the cap plate 31 and the first current collecting member 140 and between the cap plate 31 and the second current collecting member 142, and third insulating members 64 are formed between the first current collecting member 140 and the electrode assembly 120 and between the second current collecting member 142 and the electrode assembly 120.

The second insulating member 62 and the third insulating member 64 may not only perform the insulation function, but also support the first current collecting member 140 and the second current collecting member 142.

FIGS. 8 and 9 are views for explaining a discharge of gas in the rechargeable battery according to the exemplary embodiment of the present invention.

Referring to FIGS. 8 and 9, in the exemplary embodiment of the present invention, since the spacer 700 is installed, gas in the casing may be easily discharged through the vent member 39 even though the vent member 39 is positioned on the bottom plate 27a of the casing 27.

That is, gas generated in the casing 27 may be moved to the lower side of the electrode assembly 120 while passing through a space between the electrode assembly 120 and the cap plate and a space between the lateral surface of the electrode assembly 120 and the casing (see arrows).

In this case, if the electrode assembly 120 is in contact with the bottom surface of the casing 27, the gas cannot be moved to the vent member 39.

However, in the present invention, since the spacer 700 is formed, the gas, which is moved toward the lower side of the electrode assembly 120, may be easily moved to the vent member 39 while passing through the portions between the holes H and the protrusions 73 of the spacer 700. Therefore, when the internal pressure is increased to the predetermined pressure or higher, the vent member 39 is fractured, and gas is easily discharged through the vent member, such that an additional explosion may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

<Description of symbols>

| | |
|---|---|
| 2: Notch | 3: Short-circuiting protrusion |
| 4, 5, 9: Terminal hole | 21a, 22a: Electrode active portion |
| 21b, 22b: Electrode non-coated portion | 27: Casing |
| 27a: Bottom plate | 30: Cap assembly |
| 31: Cap plate | 32: Injection port |
| 34: Vent hole | 38: Short-circuiting hole |
| 38: Sealing closure | 39: Vent member |
| 50: First terminal | 52: Second terminal |
| 56: Short-circuiting member | 58: Connecting member |
| 59: Sealing gasket | 60, 62, 64: Insulating member |
| 71: Plate-shaped member | 73: Protrusion |
| 77: Fuse hole | 101: Rechargeable battery |
| 120, 120a, 120b: Electrode assembly | |
| 121: First electrode | 122: Second electrode |
| 123: Separator | 140, 142: Current collecting member |
| 250: Connection terminal | 700: Spacer |
| 802: First fixing member | 804: Second fixing member |

The invention claimed is:

1. A rechargeable battery comprising:
an electrode assembly;
a casing which accommodates the electrode assembly and has an opening;
a cap assembly which is coupled through the opening and seals the casing;
a spacer which is positioned between the electrode assembly and the casing and has multiple holes; and
a vent member which is formed on a bottom surface of the casing which is positioned opposite to the opening,
a first fixing member which surrounds the spacer and the electrode assembly.

2. The rechargeable battery of claim 1, wherein:
the spacer includes a plate-shaped member which has the holes, and
multiple protrusions which protrude toward the casing from the plate-shaped member.

3. The rechargeable battery of claim 2, wherein:
the protrusions are disposed to be symmetrical with respect to an imaginary centerline of the plate-shaped member.

4. The rechargeable battery of claim 1, wherein:
at least one of the holes corresponds to the vent member.

5. The rechargeable battery of claim 1, wherein:
the first fixing member is positioned at opposite sides of the vent member.

6. The rechargeable battery of claim 1, wherein:
the electrode assembly comprises multiple electrode assemblies.

7. The rechargeable battery of claim 6, further comprising:
a second fixing member which surrounds a lateral surface of the electrode assembly.

8. The rechargeable battery of claim 7, wherein:
the second fixing member is elongated in a direction in which the electrode assembly is inserted into the casing.

9. The rechargeable battery of claim 1, wherein:
the electrode assembly is wound.

10. The rechargeable battery of claim 1, further comprising:
a first fixing member which surrounds the spacer and the electrode assembly; and
a second fixing member which surrounds a lateral surface of the electrode assembly positioned continuously,
wherein:
the first fixing member is a polypropylene (PP) tape, and
the second fixing member is a polyimide (PI) tape.

11. The rechargeable battery of claim 1, wherein:
the spacer is made of an insulating material.

* * * * *